March 22, 1927. 1,621,522
G. C. CAPPA
VALVE GEAR FOR INTERNAL COMBUSTION ENGINES
Filed March 5, 1925
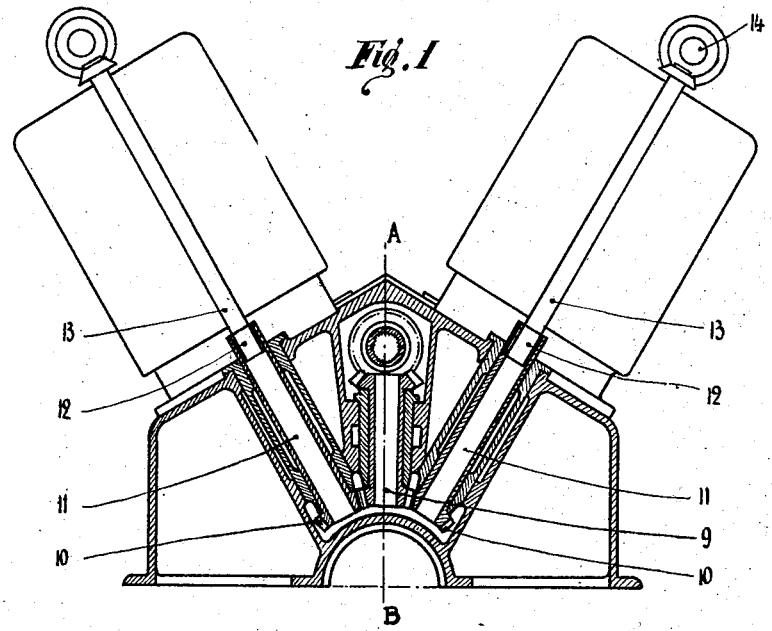
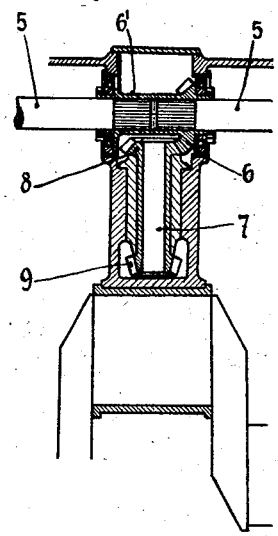
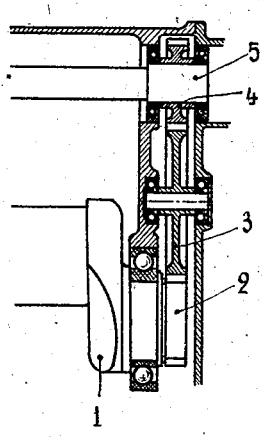
Inventor
Giulio Cesare Cappa
By
atty.

Patented Mar. 22, 1927.

1,621,522

UNITED STATES PATENT OFFICE.

GIULIO CESARE CAPPA, OF TURIN, ITALY.

VALVE GEAR FOR INTERNAL-COMBUSTION ENGINES.

Application filed March 5, 1925, Serial No. 13,278, and in Italy March 24, 1924.

This invention has for its object improvements in the driving means of the valve gears for internal combustion engines, in which the cylinders are arranged in two or more inclined rows, and it is characterized by the fact that the countershafts transmitting the motion to the cam shafts lie in the same plane as the cylinders that are operated thereby, this being possible owing to the fact that the motion is transmitted from the driving shaft to an auxiliary shaft and from this latter towards the central part of the engine through a set of shafts and gears operating the above mentioned countershafts. Through this arrangement it is possible to remove several inconveniences that are generally met with in the ordinary internal combustion engines where the countershafts lying in planes that are inclined relatively to the plane of the actuated cylinders give rise to difficulties in the assembling and to disarrangements and defective working.

The annexed drawings show a constructional form of this arrangement used in connection with a big aviation engine.

Fig. 1 is a section of the engine taken on the cross plane of symmetry thereof.

Fig. 2 is a section on line A—B of Fig. 1.

Fig. 3 is a section on the same plane as Fig. 1, but taken in correspondence with the first countershaft.

Referring to the drawings, 1 is the engine crankshaft provided at one of its ends with a pinion 2, which operates through an intermediary wheel 3, a wheel 4, keyed on a driving shaft 5 operating the ignition device (not shown) and other auxiliary members hereinafter described. From said driving shaft motion is transmitted through a pinion 6 keyed centrally thereon, to a short perpendicular auxiliary shaft 7, provided with two pinions 8 and 9, the first of which is operated by the pinion 6 while the latter transmits the motion to two pinions 10 keyed on the lower end of two hollow counter shafts 11, arranged in the same planes as the cylinders and connected by means of prismatic joints 12 to the shafts 13 transmitting the motion to the cam shafts 14 arranged on the cylinder heads.

Through the above described arrangement the assembling and dismounting of the engine are greatly facilitated, as the cylinders may be secured on the base with all auxiliary parts already applied thereon, including the countershaft 13 that will be automatically engaged and exactly in alignment if the cylinders have been exactly mounted. The shaft 5 will be conveniently divided into two parts connected through the hub 6' of the pinion 6, this rendering the construction of the engine more economical and the assembling of same easier.

What I claim is:

1. In an internal combustion engine comprising two rows of oppositely inclined cylinders having overhead valves, and camshafts for operating the latter, the combination with a crank shaft, a driving shaft parallel to the latter and driven thereby, of a short auxiliary shaft mounted perpendicular to the driving shaft in a plane bisecting the angle formed by the adjacent rows of cylinders and in the middle cross plane of the engine, and means operatively connecting the short auxiliary shaft with the cam shafts.

2. In an internal combustion engine comprising two rows of oppositely inclined cylinders having overhead valves, and cam shafts for actuating the latter, the combination with a crank shaft, a driving shaft parallel to the crank shaft driven thereby and in a plane bisecting the angle formed by the adjacent rows of cylinders, and gears connecting the crank and driving shafts at one end, of a short auxiliary shaft in said bisecting plane and in the middle cross plane of the engine perpendicular to said crank and driving shafts, gears operatively connecting the driving and auxiliary shafts, counter shafts arranged in said middle cross plane and parallel to the longitudinal axis of the cylinders, gears operatively connecting the auxiliary shaft with the counter shafts, and gears connecting the latter with the cam shafts.

3. In an internal combustion engine comprising two rows of oppositely inclined cylinders having overhead valves and cam shafts for operating the latter, the combination with a crank shaft, of a centrally divided driving shaft parallel to and driven by the latter, a pinion having a hub connecting the two parts of the driving shaft, a short auxiliary shaft perpendicular to the crank and driving shafts, a pinion on one end of the auxiliary shaft meshing with the aforesaid pinion, two countershafts in the middle cross plane of the engine, gears connecting the countershafts with the cam shafts, and gears connecting the countershafts with the auxiliary shaft.

In testimony that I claim the foregoing as my invention, I have signed my name.

GIULIO CESARE CAPPA.